United States Patent [19]

Zetena, Jr.

[11] Patent Number: 5,316,244
[45] Date of Patent: * May 31, 1994

[54] SUPPORTING BRACKETS FOR CABLE RACEWAYS

[76] Inventor: Maurice F. Zetena, Jr., P.O. Box 59, Bridgewater, Conn. 06776

[*] Notice: The portion of the term of this patent subsequent to Dec. 21, 2010 has been disclaimed.

[21] Appl. No.: 127,045

[22] Filed: Sep. 27, 1993

Related U.S. Application Data

[63] Continuation of Ser. No. 591,058, Oct. 1, 1990, Pat. No. 5,271,585.

[51] Int. Cl.$^5$ .............................................. F16L 3/00
[52] U.S. Cl. ....................................... 248/49; 248/58; 248/74.1; 248/72; 248/68.1; 403/377; 403/363; 52/665; 174/95
[58] Field of Search ................ 248/49, 58, 65, 68.1, 248/69, 74.1, 228, 73, 72; 24/435, 555, 562, 355, 295; 52/39, 665, 484, 287, 263; 174/68.3, 95

[56] References Cited

U.S. PATENT DOCUMENTS

| | | | |
|---|---|---|---|
| 683,799 | 10/1921 | Reanis | 248/228 X |
| 1,189,208 | 6/1916 | Hodkinson | 248/68.1 X |
| 1,218,283 | 3/1917 | Za Morte | 248/228 |
| 2,368,619 | 2/1945 | Soderberg | 248/65 |
| 2,536,386 | 1/1951 | Moore | 248/228 |
| 2,823,056 | 2/1958 | Di Meo et al. | 403/376 |
| 2,970,183 | 1/1961 | Anderson, Jr. | 248/49 |
| 3,013,644 | 12/1961 | Smith et al. | 52/665 |
| 3,021,581 | 2/1962 | Cook et al. | 24/362 X |
| 3,295,805 | 1/1967 | Girard | 248/68.1 |
| 3,385,488 | 5/1968 | Bronson | 274/320 X |
| 4,043,139 | 8/1977 | Scott | 248/49 X |
| 4,161,302 | 7/1979 | Siulman | 248/49 |
| 4,194,711 | 3/1980 | Winton | 248/49 |
| 4,244,544 | 1/1981 | Kornat | 248/68.1 |
| 4,386,752 | 6/1983 | Panlak et al. | 248/73 |
| 4,403,758 | 9/1983 | Burt | 248/49 |
| 4,429,440 | 2/1984 | Laughlin et al. | 248/73 X |
| 4,516,874 | 5/1985 | Yang et al. | 403/363 X |
| 4,542,871 | 9/1985 | Fortsch | 52/665 X |
| 4,723,749 | 2/1988 | Carraro et al. | 52/39 X |
| 4,765,576 | 8/1988 | Peled | 248/49 |

FOREIGN PATENT DOCUMENTS 318370 1/1959 Switzerland ................ 248/73

Primary Examiner—David A. Scherbel
Assistant Examiner—Korie H. Chan
Attorney, Agent, or Firm—Haynes N. Johnson

[57] ABSTRACT

A fiber optics cable raceway is formed of main channel members and telescope members. The main channel members have a generally U-shaped cross-section with a base, sides, and, at the top, inwardly extending lips. The telescope members have the same cross-section, but are slightly larger so they can fit about the main channel members for a longitudinally sliding fit. By alternately, interfitting main members and telescope members and adjusting the length by telescopic sliding, a raceway of the desired length can quickly be assembled. Small locking clips can then be fitted about the respective overlapping lips of two members to prevent further sliding. The raceway can be installed below the floor by the use of brackets hanging on pre-existing floor-supporting pedestals. It can be installed above a dropped ceiling by the use of hangers clamped to the grid struts of the ceiling. The locking clips serve to electrically interconnect the channel members and the telescope members.

4 Claims, 5 Drawing Sheets

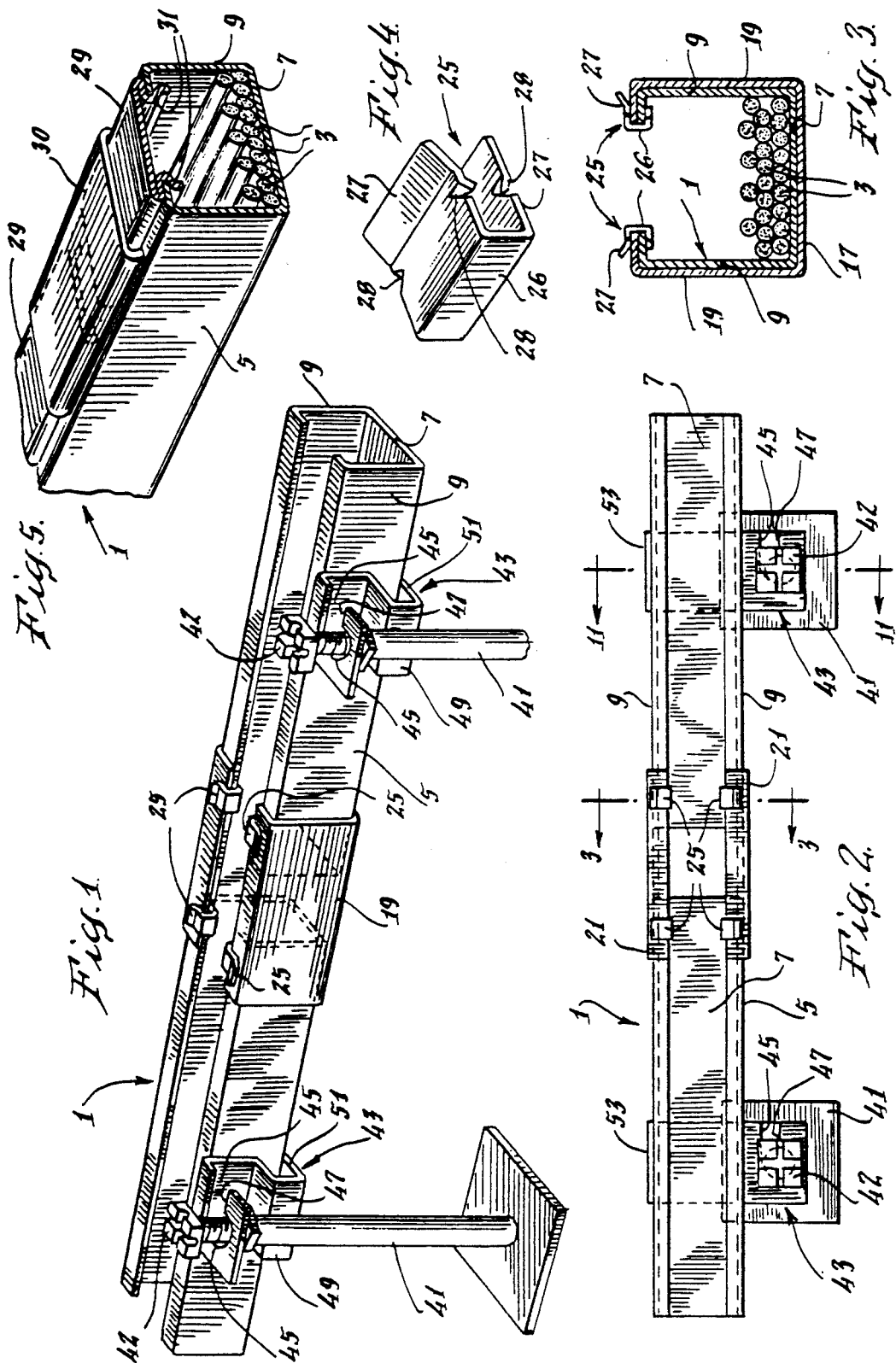

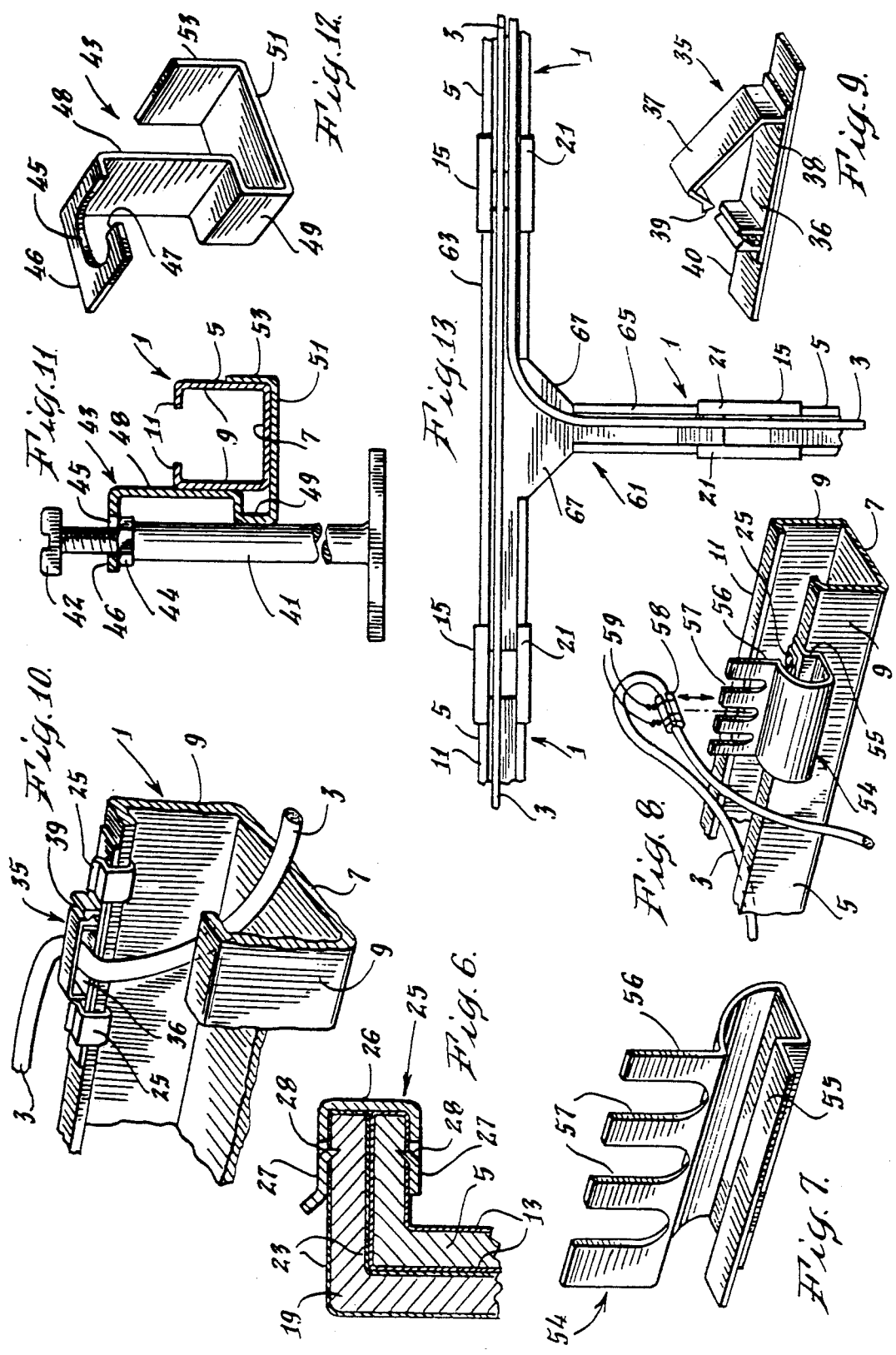

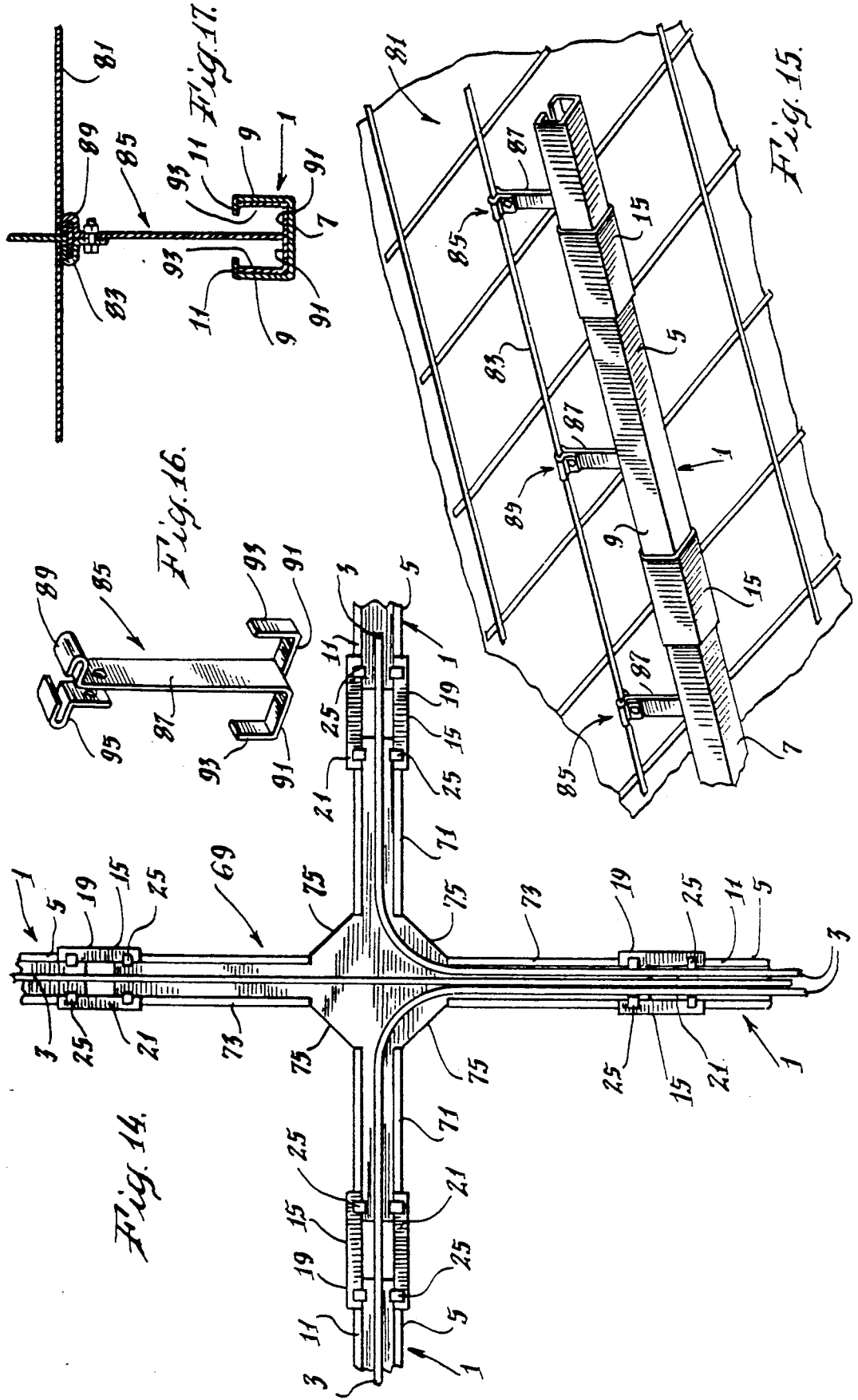

SUPPORTING BRACKETS FOR CABLE RACEWAYS

This is a continuation of co-pending application Ser. No. 07/591,058, filed Oct. 1, 1990 now U.S. Pat. No. 5,271,585.

FIELD OF THE INVENTION

This invention relates to the field of fiber optics and, in particular, to raceways used to carry fiber optic cables through interior spaces, such as offices. It is directed to a modular design in which the lengths of different parts of the raceways can be readily adjusted at the time of installation.

BACKGROUND OF THE INVENTION

Fiber optics cables, often carrying two fibers each, do not have the intrinsic strength found in electrical cables and, so, must be carried in raceways or other channel members rather than being strung using standard wire hangers. These raceways are sometimes installed beneath raised flooring. In order to install them in different locations, the installer either has to carry a wide variety of lengths or cut them to the desired length on location. My invention obviates this difficulty and yet provides a strong and stable raceway structure.

BRIEF SUMMARY OF THE INVENTION

I create a raceway for fiber optic cables by using a plurality of channels which can telescope longitudinally within one another in order to adjust the length. Thus, the installer can carry with him a limited assortment of channel lengths and, by sliding one channel longitudinally within another, adjust the length to that desired. This results in shortened installation times and less wastage.

The raceways are formed of main channel members and telescope members. The main channel members are rectangular in cross-section, with a generally U-shape, and have a base, sides, and, at the top, inwardly extending lips. The telescope members have the same cross-section, but are sufficiently larger or smaller so they can fit about or within the main channel members for a longitudinally sliding fit. By alternately, interfitting main members and telescope members and adjusting the length by telescopic sliding, a raceway of the desired length can then be quickly be assembled. Small locking clips can then be fitted about the respective overlapping lips of two members to frictionally engage them and so prevent further sliding movement. Generally, an installation can be completed without the use of tools.

The raceway can be installed using pre-existing structures. For example, it is installed below a raised floor by securing it to the floor-supporting pedestals by using pedestal brackets; it can be installed below a dropped ceiling by the use of hangers clamped to the grid struts of the ceiling; and it can be installed above a dropped ceiling by use of a clamp adapted to fit the wire or ladder tray.

Cables can enter and leave the raceway through cable clamps, strain relievers, or connector boxes attached to the edges of the raceways.

DESCRIPTION OF THE DRAWINGS

FIG. 1 is a perspective view of my modular raceway as it would be installed beneath a floor, the raceway being supported on pedestals (the pedestals having been previously installed to support the floor).

FIG. 2 is a top plan view of the raceway.

FIG. 3 is a section, taken on line 3—3 of FIG. 2.

FIG. 4 is a perspective view of a locking clip used to secure channel and telescope members together against relative longitudinal movement. It is also used to secure other devices, such as cable clamps and strain relievers, to the lips of channel members.

FIG. 5 is a partial perspective end view of a section of raceway showing the use of a telescoping cover to enclose the raceway.

FIG. 6 is a transverse section through a locking clip as it is used to hold channel and telescope members together.

FIG. 7 is a perspective view of a strain reliever which is affixed to the lip of a channel or telescope member to hold fiber optic cables as they enter or leave the member.

FIG. 8 is an exploded view of the strain reliever in use.

FIG. 9 is a perspective view of a cable clamp of a type which can be secured to the edge of a channel member to hold cables entering or leaving the raceway.

FIG. 10 is a perspective view of the cable clamp of FIG. 9 in use.

FIG. 11 is a partial transverse section showing the installation of a raceway on previously-installed pedestals.

FIG. 12 is a perspective view of the type of bracket used to support the raceway from a pedestal.

FIG. 13 is a T-section channel permitting raceways to go off in side channels.

FIG. 14 is a cross-section channel permitting two raceways to cross or to provide two side channels.

FIG. 15 is a perspective view showing my raceway installed beneath a dropped ceiling. The raceway is similar to that of FIG. 1 except for its means of support.

FIG. 16 is an exploded perspective view of a hanger used to support my raceway from the grid strut of a hung ceiling.

FIG. 17 is a transverse section showing such installation.

DETAILED DESCRIPTION OF THE INVENTION

Figure 18:
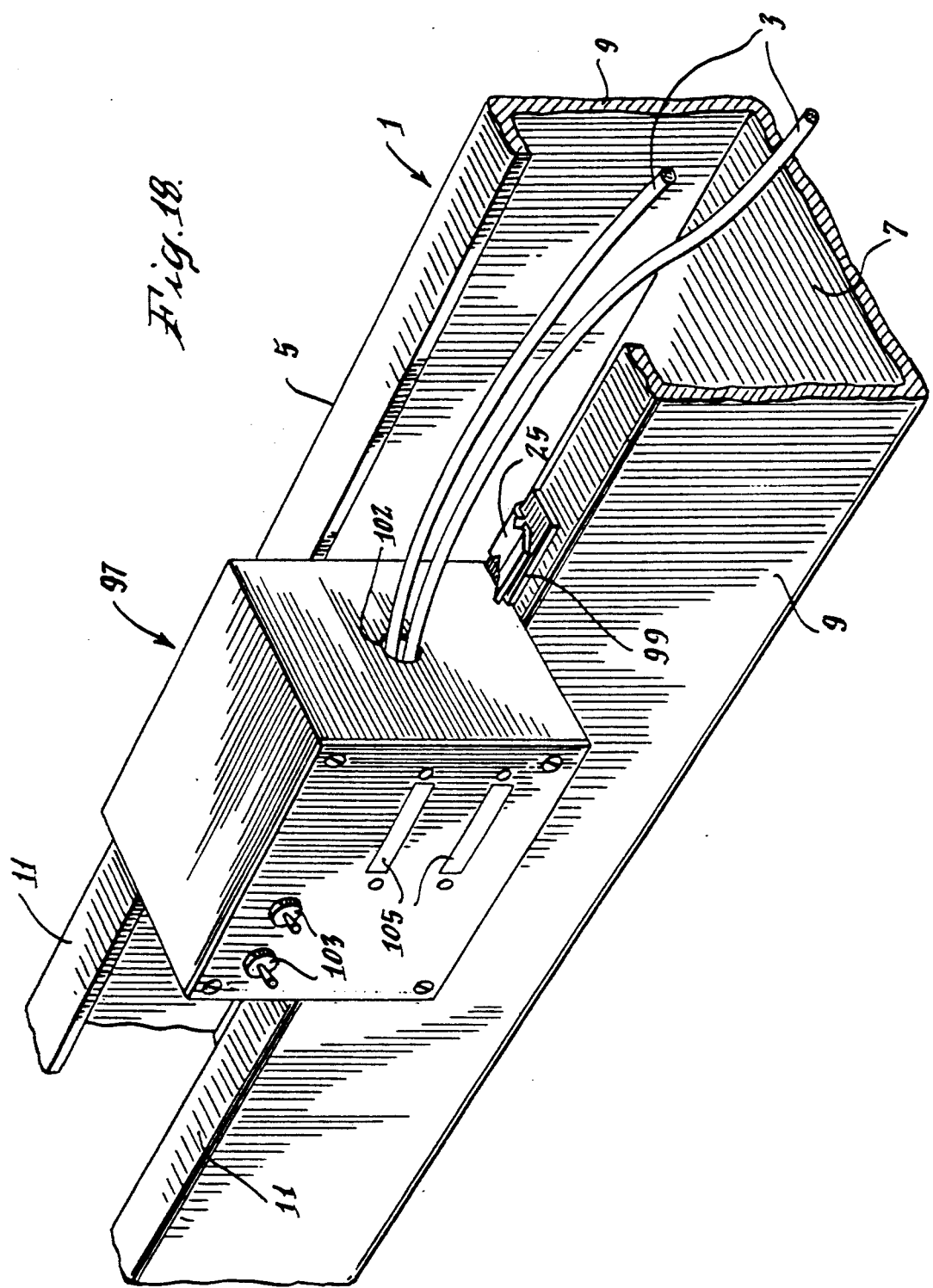
FIG. 18 is a perspective view of a connector box attached to the raceway.

Raceway 1, used to carry fiber optics cables 3, consists of three principal elements, channel members 5, telescope members 15, and a support means. Channel member 5 includes a base 7, sides 9 rising vertically from the base, and inwardly-extending lips 11 along the top edges of the sides. It may also include a series of notches 13 in the sides. It has a generally rectangular, U-shaped cross-section.

Telescope member 15 is similar to channel member 5. It includes a base 17, sides 19, and inwardly extending lips 21. Telescope member 15 has the same cross-sectional configuration as channel member 5, but is slightly larger so that it can slip longitudinally about member 5 in a telescoping fashion. Alternatively, for the same purpose, telescope member 15 could be slightly smaller in cross-section so that it could slide within channel member 5.

Members 5 and 15 should be made of stiff sheet material such as painted or plated aluminum of 0.050 inch thickness. Preferably, they have chromate conversion coatings 13 and 23, respectively, (FIG. 6). A useful dimension for channel member 5 is a 2.50 inch wide base and 2.00 inch high sides, with 0.31 inch inwardly extending lips. Telescope member 15 would then be slightly larger so that it could slide longitudinally along member 5. Installation can be readily made if channel members are provided in lengths of 1, 4, and 6 feet, and telescope members in lengths of 4, 8, and 12 inches.

A raceway is installed by taking the necessary channel members 5 for the length desired and linking them together with telescope members 15, by sliding the telescope member over adjacent ends of channel members. Thus, there will be one telescope member 15 between each two channel members 5. So that the degree of telescoping is not limited, there should be no obstructions to the sliding movement on either the channel members or the telescope members. Consequently, the finished length of the raceway can be adjusted with no cutting by simply adjusting the extent to which telescoping takes place.

Once the length is set, the members can be locked in place against further sliding movement changing the length by pressing locking clip 25 over the respective adjacent lips 11 and 21, holding them from relative movement by friction. This is shown in FIGS. 1 and 3.

Locking clip 25 (FIG. 4) is a simple U-shaped structure, having a base 26 and generally parallel extending flanges or arms 27. The flanges are spring-pressed towards one another so that, when placed about the lips, they hold the lips against relative longitudinal movement, thus locking the channel member and telescope member against relative longitudinal movement. The outer ends of one or both of the flanges 27 are flared so the clips can be easily slipped over the lips. The longitudinal ends of the flanges are nicked to create inwardly-directed projections, as shown at 28, to further lock the clips in place. The clips are made of 0.014 inch plated steel and measure one-half inch long, one-eighth inch across the base, and have flanges extending about one-quarter inch outwardly.

Locking clips 25 could also be called connector clips. As can be seen in FIG. 6, the nicks 25 on the clips scratch through the coating 13 on channel member 5 and the coating 23 on telescope member 15 and so make electrical contact with the metal underneath the coatings. This connects the two members electrically. Thus, my raceway to conforms to Underwriters Laboratory regulations which require that covered trays carrying conductive cables be connected with a resistance between them of less than 5 milli-ohms.

FIGS. 1 and 11 show my preferred supporting means when the raceway 1 is installed below the floor. Pedestals 41, which have previously been installed at intervals to support the underfloor, can now be used also to support the raceway. The pedestals have an upper end 42 of reduced diameter held in place by an adjustment nut 44 (the raised floor rests on end 42).

I support the raceway from the pedestals by using a metal pedestal bracket 43 (FIGS. 1, 11, and 12). Bracket 43 has a horizontal area 46 at the top with an opening 45 in it and an 15 off-center slot 47 leading to the opening. Opening 45 is fitted about end 42 by use of slot 47, and the horizontal area 46 rests on nut 44. The side 48 of the bracket extends downwardly to transverse positioning shoulder 49, bracket 43 being bent towards the pedestal to form the shoulder 49. The shoulder is so dimensioned that, when the shoulder rests against the pedestal, the bracket is held vertically. The base 51 of the bracket is then horizontal, and an upward arm 53 on the opposite side of the base from the shoulder is vertical. Bracket 43 is dimensioned to receive and hold a channel member 5 or a telescope member 15, forming a cradle for the member (see FIG. 11). The vertical dimensions of side 48 and shoulder 49 determine the height of the finished raceway.

Once the brackets 43 are in place and the raceway itself has been placed within them, the raceway structure has rigidity; and the unit is strong and will remain in place. Fiber optic cables 3 can then be placed in and carried by the raceway.

FIGS. 7 and 8 show a structure by means of which fiber optic cables 3 can enter and leave the raceway. Strain reliever 54 has an attaching lip 55 extending laterally which can be used, in conjunction with locking clips 25, to secure it to the lip 11 or 21 of channel member 5 or telescope member 15. Its upper portion forms a cable holder 56 with cable-retaining slots 57. A cable 3 is encircled with a protective grommet 58 which is held in place with tie wraps 59. Grommet 58 can be a piece of tubing slit lengthwise and of a size to fit about and hold the cable. The slots 57 are sized to receive and firmly hold grommet 58.

When one wishes to have a cable 3 enter or leave raceway 1, he simply installs a strain reliever 54 at that place, secures a grommet about the cable, and fits the grommet into a slot 57.

Alternatively, cables may enter or leave the raceway through the top, using cable clamp assembly 35 (FIGS. 9 and 10). Assembly 35 is formed of a molded plastic base 36, sides, a top 37, hinged to one side at 38, with a latch 39 so that it can be opened and closed. Base 36 is adhered to sheet metal base 40, which latter can be secured to the lips 11 or 25 with a locking clip 25 at each end.

The raceway may be enclosed with a cover 29 (FIG. 5). This cover would have downwardly extending legs 31, spring-pressed outwardly to fit between opposing lips 11 or 21. The legs 31 would snap into place and lock between the lips. If curved slightly outwardly, they would hold in place even more securely. The covering can also telescope. This is done by using a telescoping cover member 30 which is slightly larger than cover 29 and of a complementary shape, so that it fits about cover 29 in sliding engagement or is snapped in place from above.

If desired, the raceway can have junctions with other raceways. To this end, a T-section channel 61 (FIG. 13) can be used. It includes main channel 63 and side channel 65. To avoid sharp bends in the cables, the unit can have angled corners 67 running at 45 degree angles to the channels. The raceway can also have intersecting channels by using a cross-section member 69 (FIG. 14). This latter includes main channel sections 71, side channels 73, and angled corners 75. Similarly, one could have corner members for turning the raceway at any desired angle.

My raceway can also be suspended from a dropped ceiling 81, as shown in FIGS. 15 and 17. In this instance the channel members 5 and telescope members 15 are assembled as before and are then hung on hangers 85.

Hangers 85 (FIGS. 16 and 17) are units designed to attach to the grid struts 83 of the ceiling. They include an elongated body 87 having a U-shaped upper clamp 89 to fit about the grid struts cooperatively with a complementary mating clamp 95, the two being held together with a bolt. The lower portion of hanger 85 is split into two arms 91 which run horizontally in opposite directions and then upwardly in extension arms 93. The total length of the horizontal arms 91 is such that they will just fit cross-wise within a channel member 5 or telescope member 15, and the extension arms 93 are of a length to just fit under and 15 support lips 11 or 21. Hanger 85 can then be snapped into place in a channel member 5 or a telescope member 15. Arms 93 may be slightly bent outwardly so that they are held spring-pressed against the sides 9 or 19 for an even more secure fit. Thus, the raceway is supported by the lips resting on the ends or extension arms 93.

Once at least two of the hangers have been attached, the raceway cannot turn relative to the hangers and, so, cannot be accidentally released.

My raceway can also be mounted above a raised ceiling. In this instance, clamp 89 and mating clamp 95 are shaped to fit the wire or ladder tray and are secured to it.

As an additional feature of my invention, a connection box 97 can be attached on one side of the raceway (FIG. 18). The box would have an opening 102 to receive cables 3 and be internally connected to external fiber optic connectors 103 or through FDDI connector mounting slots. The box could have a mounting bracket 99 extending from its base such that it could be clipped to lip 11 with a locking clip 25.

Figure 19:
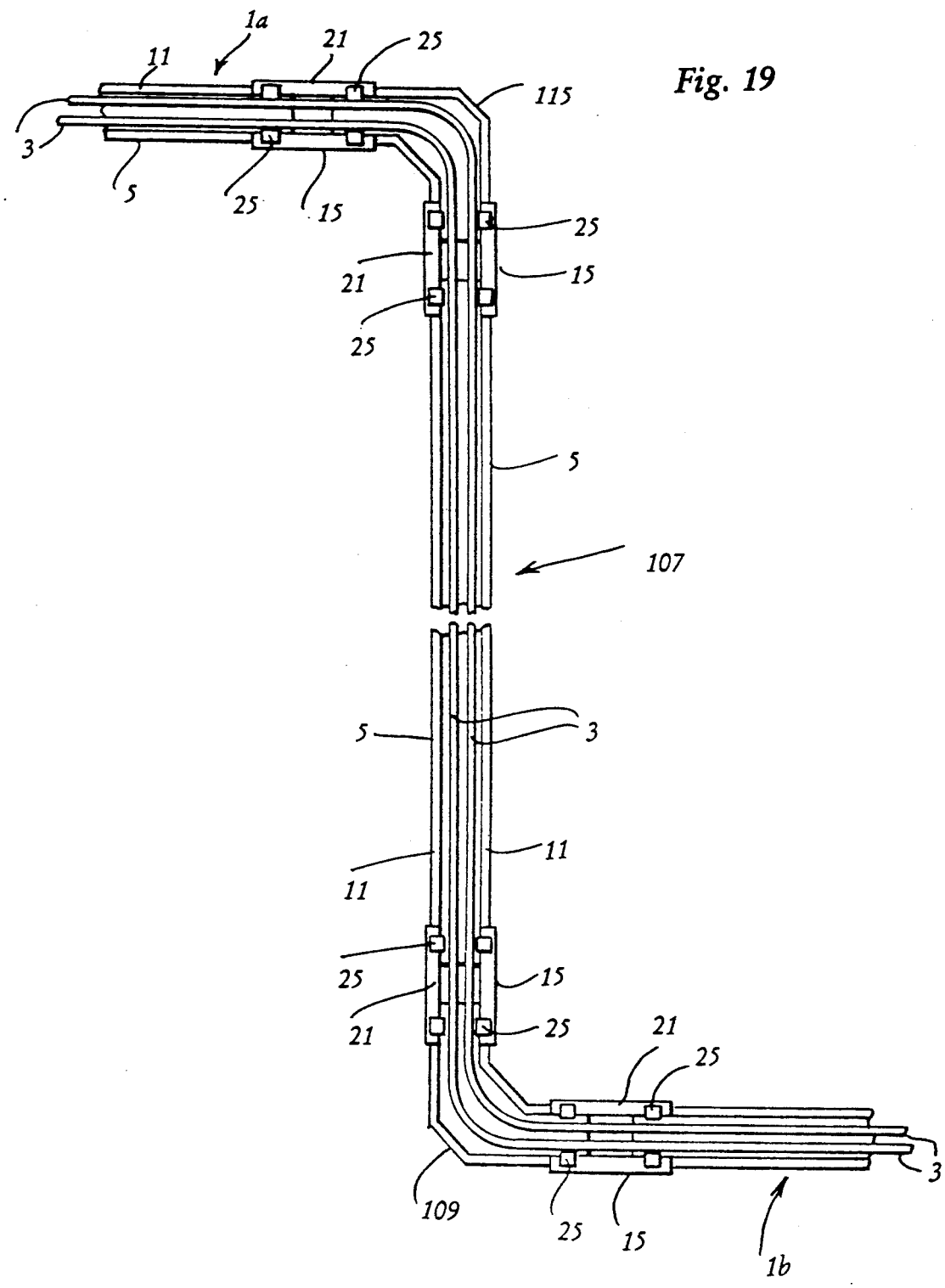
FIG. 19 is a vertical section showing a channel members interconnecting raceways which are at two different horizontal levels.

If desired, a vertical raceway 107 can be constructed to connect two horizontal raceways 1a and 1b at different levels (FIG. 19). This structure could be used to have the raceway 1 enter or leave the space below the floor or above a dropped ceiling. To make this vertical raceway, two vertical corner connectors 109 and 115, having cross-sections similar to channel member 5, are used. Each of the connectors has two 45° bends, so that the connector runs horizontally at each end while its central portion is vertical. The lower corner connector 109 is bent such that the open area with its inwardly extending lips 111 is on the inside of the curve. The upper corner connector 115 is bent such that the open area with its inwardly extending lips 117 is on the outside of the curve. The corner connectors are attached to the channel members 5 of the horizontal raceways with telescope members 15 and locking clips 25 in the same manner as the horizontal raceways are installed. The vertical connector can have a cover 29 similar to the cover used elsewhere.

Thus, as can be seen, I have provided a modular system which allows for simple, rapid installation. It is also a system which is flexible in that its configuration can be readily varied from time to time if desired.

I claim:

1. A cable raceway adapted to be supported form pre-existing internal building structures, said raceway including a plurality of channel members, each said channel member being formed of stiff sheet material and including a bottom portion, sides extending upwardly from said bottom portion, and lips extending inwardly from said sides along the upper edges of said sides, thereby having a generally upright U-shaped cross-section, telescope members having a cross-section complementary to said channel members and being so shaped and dimensioned as to telescopically interfit with said channel members, the extent of said interfit being continuously variable, each said telescopic member being formed of stiff sheet material and including a bottom portion, sides extending upwardly from said last-named bottom portion, and lips extending inwardly from said sides of said telescoping members along the upper edges of said last-named sides, thereby having a generally U-shaped cross-section, said telescope members each telescopically joining two said channel members at the respective proximate ends thereof, and brackets having securing means proximate to the upper ends of said brackets for supporting said channel members and said telescope members from said building structures at spaced intervals, said building structures being floor-supporting pedestals, said brackets having openings at their upper ends for receiving the upper ends of said pedestals, and said brackets having downwardly-extending sides leading to open and upright U-shaped lower ends dimensioned to receive said channel members with their respective said upper edges being uppermost, whereby said raceway has telescopic length flexibility for easy installation.

2. A cable raceway as set forth in claim 1 in which said downwardly-extending sides include positioning shoulders for spacing said raceway from said pedestals.

3. A channel for holding fiber optic cables and the like, said channel including a plurality of channel members, each said channel member being formed of stiff sheet material and including a base, vertically-extending sides, and inwardly-extending lips along the upper edge of said sides, thereby having a generally upright U-shaped cross-section, telescope members having a cross-section like said channel members, but being of sufficiently greater overall dimension as to telescopically fit about a said channel member, said telescope members being formed of stiff sheet material and including a base, vertically-extending sides, and inwardly-extending lips along the upper edges of said last-named sides, said telescope members telescopically joining said channel members, the extent of said telescopic joining being continuously variable, whereby said telescopically joined channel members and said telescope members can be made of continuously varying lengths, and means for supporting said channel members and said telescope members at spaced intervals, said means for supporting said channel members and said telescope members at spaced intervals including a plurality of pedestals and pedestal brackets, each said pedestal bracket having an opening at the upper end of said pedestal bracket to fit about the upper end of a said pedestal and the lower end of said pedestal bracket being shaped to receive and hold a said channel member or a said telescope member with its said U-shaped cross-section upright, whereby a channel can be made having telescopic length flexibility for easy installation.

4. A channel as set forth in claim 3 in which at least one of said channel members is a corner piece.

* * * * *